US 6,817,501 B1

(12) United States Patent
Rogers et al.

(10) Patent No.: US 6,817,501 B1
(45) Date of Patent: Nov. 16, 2004

(54) MOTORCYCLE PACK SUPPORT ASSEMBLY, EXTENSION KIT AND METHOD

(76) Inventors: Max Rogers, 19 Sanders Rd., Rockaway, NJ (US) 07866; Arthur Kobylinski, 9 River Rd., Boonton, NJ (US) 07005

( * ) Notice: Subject to any disclaimer, the term of this patent is extended or adjusted under 35 U.S.C. 154(b) by 141 days.

(21) Appl. No.: 10/351,670

(22) Filed: Jan. 28, 2003

(51) Int. Cl.⁷ .................................................. B62J 7/00
(52) U.S. Cl. ...................... 224/413; 224/423; 224/426; 224/431; 224/435; 224/443
(58) Field of Search ................................ 224/413, 418, 224/419, 423, 425, 426, 429, 430, 431, 433, 435, 443, 445, 452

(56) References Cited

U.S. PATENT DOCUMENTS

| | | | | |
|---|---|---|---|---|
| 460,332 A | * | 9/1891 | Coates | 224/416 |
| 1,030,844 A | * | 6/1912 | Howell | 280/202 |
| 3,346,156 A | * | 10/1967 | Jones | 224/413 |
| 3,625,405 A | * | 12/1971 | Kezar et al. | 224/413 |
| 3,802,598 A | * | 4/1974 | Burger et al. | 280/202 |
| 3,901,534 A | * | 8/1975 | Popken | 280/304.4 |
| 4,096,980 A | * | 6/1978 | Clow | 224/441 |
| 4,174,795 A | * | 11/1979 | Jackson et al. | 224/430 |
| 4,195,757 A | * | 4/1980 | Jefferson | 224/414 |
| 4,230,245 A | * | 10/1980 | Pold et al. | 224/445 |
| 4,260,085 A | * | 4/1981 | Jefferson | 224/414 |
| 4,266,703 A | * | 5/1981 | Litz | 224/443 |
| 4,383,625 A | * | 5/1983 | Kiang | 224/445 |
| 4,501,384 A | * | 2/1985 | Itoh | 224/435 |
| 5,577,646 A | * | 11/1996 | White | 224/422 |
| 5,622,374 A | * | 4/1997 | Rudeen et al. | 280/202 |
| 5,725,138 A | * | 3/1998 | Zagrodnik | 224/413 |
| 5,931,360 A | * | 8/1999 | Reichert | 224/413 |
| 6,293,450 B1 | * | 9/2001 | Aron | 224/430 |

* cited by examiner

Primary Examiner—Stephen K. Cronin
(74) Attorney, Agent, or Firm—Thomas L. Adams

(57) ABSTRACT

A pack extension kit can rearwardly shift a pack-supporting rack that has a pair of longitudinal arms normally supported in the rear by a rear structure on a motorcycle, and in the front by a pair of front structures on the motorcycle. The kit has a pair of elongate supports and a pair of spacers. The pair of elongate supports are sized to separately cradle the longitudinal arms of the rack. Each of the elongate supports has (a) a first fastening location adapted to be attached to the rear support structure, and (b) a second fastening location adapted to be attached to the pack through one of the longitudinal arms. Each of the pair of spacers is adapted to be separately attached between one of the front structures and a corresponding one of the longitudinal arms. The motorcycle is prepared by detaching the pack and the rack. The pair of elongate supports is mounted between the rear structure and the pair of longitudinal arms, and contemporaneously, the pair of spacers is mounted between the front structures and the longitudinal arms. The pack can then be placed on the rack by fastening from the elongate supports through the rack to the pack.

14 Claims, 2 Drawing Sheets

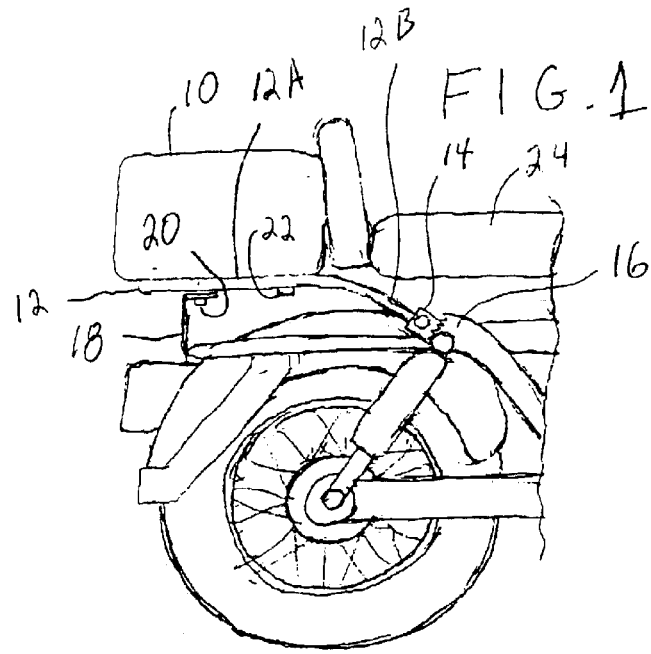
FIG. 1 PRIOR ART
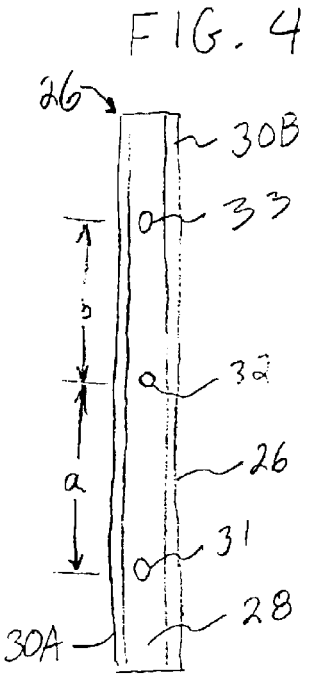
FIG. 4
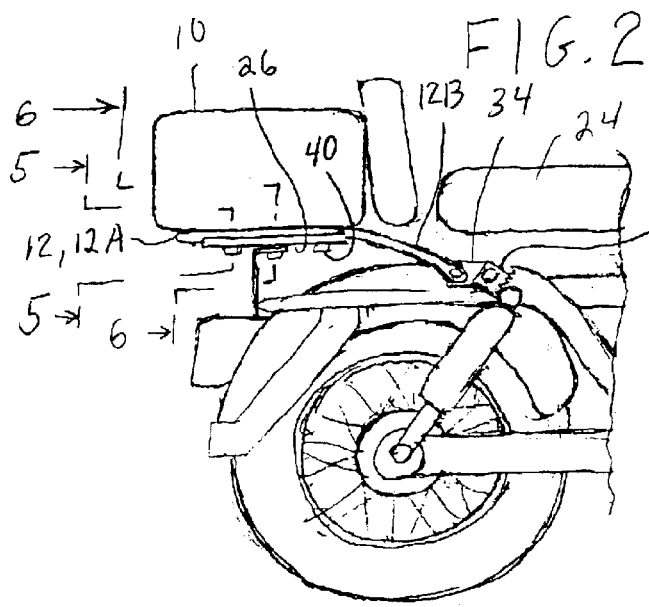
FIG. 2
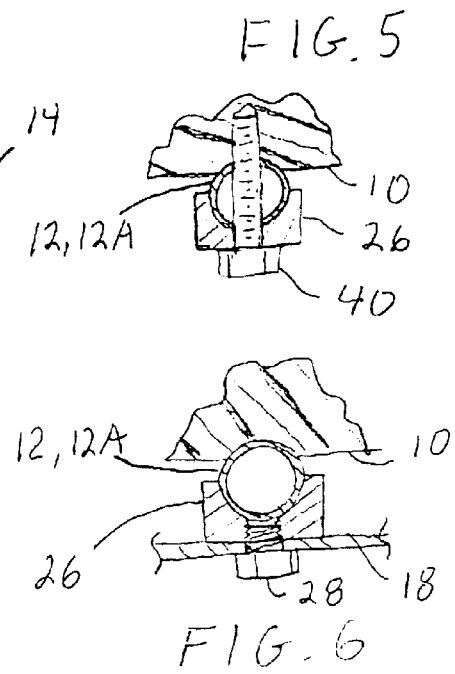
FIG. 5
FIG. 6

MOTORCYCLE PACK SUPPORT ASSEMBLY, EXTENSION KIT AND METHOD

BACKGROUND OF THE INVENTION

1. Field of the Invention

The present invention relates to the mounting of packs to motorcycles.

2. Description of Related Art

Storage boxes, known as tour packs, have been mounted on a rack that extends rearwardly over the rear wheel of a motorcycle. A motorcycle passenger may be seated between the tour pack and the driver, but this position becomes cramped and uncomfortable for long journeys. This problem is exacerbated when the driver and passenger are large persons.

A straightforward solution would be to drill new mounting holes on the rack in order to reposition the tour pack. Drilling new holes in the rack is undesirable for aesthetic reasons and can seriously reduced the resale value of a classic motorcycle such as a Harley Davidson motorcycle. Moreover, the rack has limited strength and drilling new holes will unacceptably weaken the rack.

In U.S. Pat. No. 4,501,384 guide channels 13 and 14 on the underside of tour box 5 fit around rails 8 and 9, which are part of a structure whose end portions 6 and 7 are bolted to a motorcycle. Box 5 slides on rails 8 and 9 before locking into one of the holes 12 to maintain the selected position.

In U.S. Pat. No. 5,577,646 channels 56 on the underside of a pet carrier slide onto frame 63 and are held in place by detent 65. Frame 63 is supported by struts that are attached to stay 18 and the rear axle of a bicycle.

In U.S. Pat. No. 4,383,625 the slide rods 42, 44 attached to a bicycle's seat stays are adjustably fitted in channels on either side of slide block 40 to support platform 22. Platform 22 is also supported by struts attached to the rear axle. The slide rods 42, 44 are held in position by lock screws 64.

In U.S. Pat. No. 4,266,703 a frame 10 with T-shaped ribs is mounted atop shell 21, which is bolted to the frame of a motorcycle. A luggage box 15 has a number of T-shaped ribs 16 that slidably interlock with the ribs of frame 10. Box 10 can be locked into position by inserting plunger 17 into one of the adjustment holes 13 on frame 10.

In FIGS. 6–8 of U.S. Pat. No. 4,174,795 platform 78 has channels 94 and 98 for holding adjustable rear extension bracket 104 and front adjustment rods 82, 84. The adjustment of bracket 104 and rods 82, 84 is accomplished with set screws. Platform 78 is supported at the rear axle by struts 80 and at frame 86 by clevis 87, which attaches to adjustment rods 82, 84.

In U.S. Pat. No. 3,901,534 a U-shaped frame is pivotally attached to a bracket 28 that is bolted to a motorcycle fender at position 32.

In U.S. Pat. No. 3,802,598 a child's seat frame is attached to a seat post by with an adjustable bracket 18 and to a seat stay by adjustable links 48 and 49. See also U.S. Pat. No. 5,622,374.

In U.S. Pat. Nos. 4,195,757 and 4,260,085 a rear rack 18 has its support legs attached to the upper bolt 24 of shock absorber 14 and retaining bolt 26 of the rear turn signal lamp 16.

In U.S. Pat. No. 5,931,360 rack supporting structure 10 is attached to components bolted at the frame 35 and shock absorber 38. Structure 10 can support a seat or luggage box and can be quickly removed.

SUMMARY OF THE INVENTION

In accordance with the illustrative embodiments demonstrating features and advantages of the present invention, there is provided a pack extension kit for rearwardly shifting a pack-supporting rack having a pair of longitudinal arms normally supported in the rear by a rear structure on a motorcycle, and in the front by a pair of front structures on the motorcycle. The kit has a pair of elongate supports and a pair of spacers. The pair of elongate supports are sized to separately cradle the longitudinal arms of the rack. Each of the elongate supports has (a) a first fastening location adapted to be attached to the rear support structure, and (b) a second fastening location adapted to be attached to the pack through one of the longitudinal arms. Each of the pair of spacers is adapted to be separately attached between one of the front structures and a corresponding one of the longitudinal arms In accordance with another aspect of the invention, a method is provided for rearwardly shifting a pack-supporting rack that has a pair of longitudinal arms normally supported in the rear by a rear structure on a motorcycle and in the front by a pair of front structures on the motorcycle. The method includes the step of detaching the pack and the rack from the motorcycle. Another step is contemporaneously mounting (a) a pair of elongate supports between the rear structure and the pair of longitudinal arms, and (b) a pair of spacers between the front structures and the longitudinal arms. The method also includes the step of fastening the pack in place on the rack by fastening from the elongate supports through the rack to the pack.

In accordance with yet another aspect of the invention an assembly is provided for mounting a pack on a pack-supporting rack that has a pair of longitudinal arms normally supported in the rear by a rear structure on a motorcycle, and in the front by a pair of front structures on the motorcycle. The assembly has a pair of elongate supports and a pair of spacers. Each of the pair of elongate supports is sized to separately cradle the longitudinal arms of the rack. Each of the elongate supports has (a) a first fastening location attached to the rear support structure, and (b) a second fastening location attached to the pack through one of the longitudinal arms. Each of the pair of spacers is separately attached between one of the front structures and a corresponding one of the longitudinal arms.

By employing apparatus and methods the foregoing type an improved technique is achieved for mounting a motorcycle pack in an extended position. In a preferred embodiment a motorcycle tour pack is unbolted from a U-shaped rack that is rearwardly supported where its two longitudinal arms join together, by a rear frame designed to hold a license plate. The rack itself is unbolted from the motorcycle and reattached with an intervening pair of longitudinal channels that cradle and reinforce the longitudinal arms. Specifically, the channels have central threaded bolt holes that allow bolting to the license plate frame.

The forward ends of the longitudinal arms are reattached to front support structures on the motorcycle frame by spacers in the form of plates with two bolt holes, which accommodate shifting of the rack by, for example, two inches. The longitudinal arms of the rack may then be placed in the cylindrical grooves of the longitudinal channels. The channels have bolt holes that align with the pre-existing bolt holes in the longitudinal arms, so that the tour pack can be bolted atop the rack without the need to drill additional holes in the rack. Accordingly, the channels cradle and reinforce the longitudinal arms, greatly enhancing their reliability.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein:

FIG. 1 is an elevational view of the rear portion of a motorcycle fitted with a tour pack in a manner known in the prior art;

FIG. 2 is an elevational view of the motorcycle of FIG. 1 fitted with an improved extension assembly or kit in accordance of principles of the present invention;

FIG. 4 is a plan view of the elongate support of FIG. 3;

FIG. 5 is a cross-sectional view taken through line 5—5 of FIG. 2; and

FIG. 6 is a cross-sectional view taken through line 6—6 of FIG. 2;

DETAILED DESCRIPTION OF THE PREFERRED EMBODIMENTS

Figure 3:
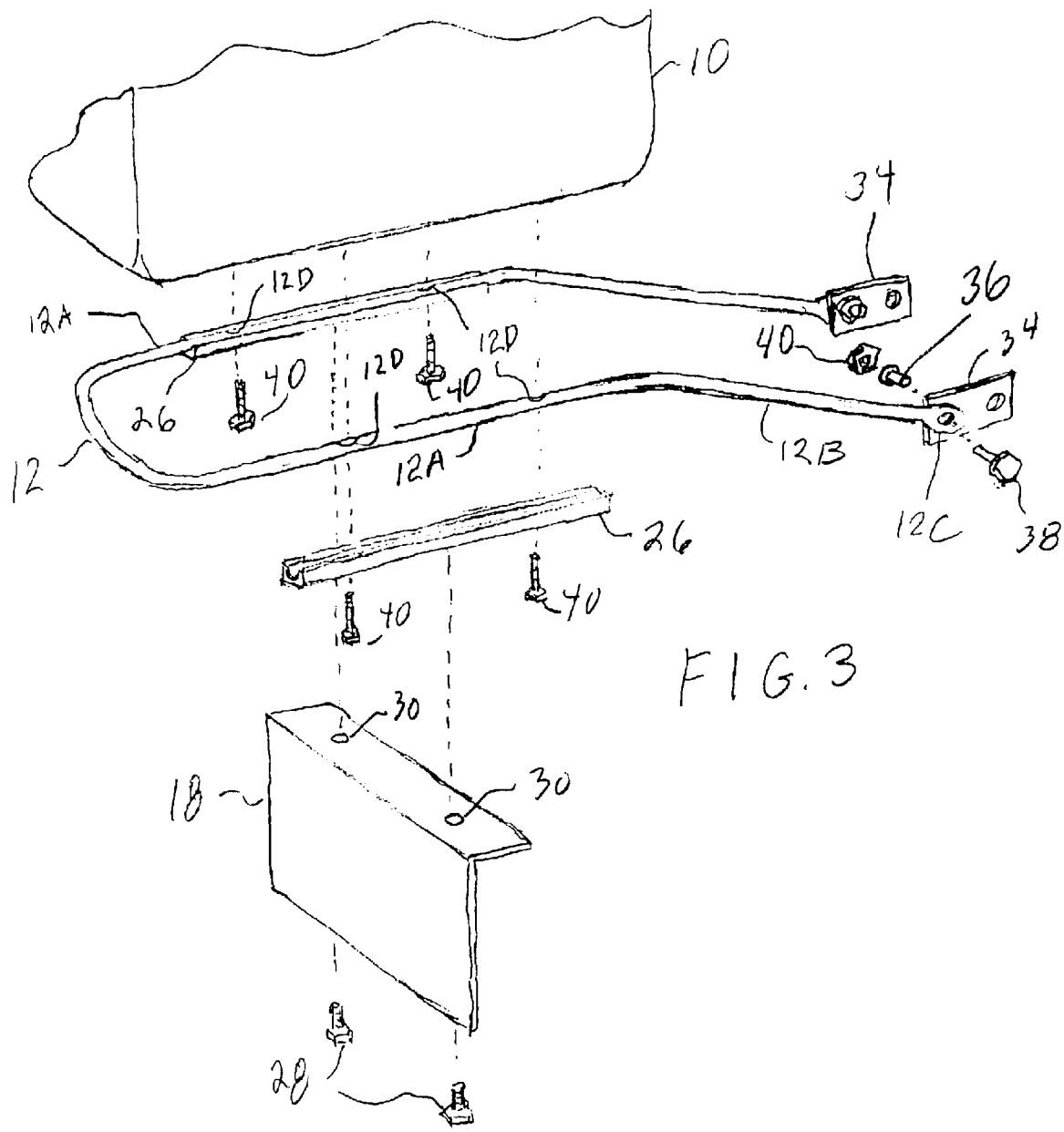
FIG. 3 is a detailed, exploded view of a portion of the arrangement of FIG. 2.

Referring to FIG. 1. a motorcycle in accordance with the prior art is shown with a tour pack 10 mounted atop a pack-supporting rack 12. Rack 12 has a pair of longitudinal arms, each having a rear section 12A and inclined section 12B, extending at an obtuse angle from section 12A. The tips of the inclined forward section 12B of the longitudinal arms connect to front structure 14. Structure 14 is part of the motorcycle frame. A portion of frame structure 16 is broken away to reveal more of structure 14. The rear section 12A of rack 12 is supported on rear structure 18, which is designed to support a license plate. In particular, a bolt 20 passes through structure 18 and the pre-existing bolt holes in rack 12 and is threaded into the underside of tour pack 10.

It is desirable to move pack 10 rearwardly to provide additional room for a passenger straddling seat 24. While one could shift pack 10 back by drilling new bolt holes in rack 12 and mounting pack 10 on them, these new holes would weaken the rack and are undesirable for aesthetic and economic reasons. Instead, the technique described hereinafter allows backward shifting of the pack without the need to modify rack 12. To implement this technique, an installer would first remove bolts 20 and 22 to remove pack 10 and then unbolt rack 12 from front structure 14 in order to remove rack 12.

Referring to FIGS. 2–6, the illustrated pack extension kit forms an assembly for supporting a pack 10 in an extended position. The kit may be installed by first attaching elongate supports 26 to rear support 18. As previously mentioned, support 18 is designed to support a license plate and is shown in FIG. 3 as a bracket having an inverted L-shaped cross-section. Bolts 28 may be installed through bolt holes 30 in structure 18 and threaded into tapped bolt holes 32 located at a first fastening location in elongate supports 26. As shown in FIG. 6, bolt 28 threads into but not through support 26.

In this embodiment, support 26 is a rectangular rod having a cylindrical groove 28 running along its length between two opposing walls 30A and 30B. It will be appreciated that in some instances attachment of the support 26 to structure 18 may be delayed until after the front portion of rack 12 is reinstalled, or even until after pack 10 is installed onto rack 12 with supports 26.

The tips of each of the longitudinal arms 12A of rack 12 are swaged into a flat segment 12C having a bolt hole. Instead of again attaching directly to the motorcycle frame, segment 12C is attached to a spacer 34, shown as a plate with a pair of bolt holes. In particular, flanged bushing 36 is inserted through the bolt holes in plate 34 and segment 12C before bolting them together with bolt 38 and nut 40. The other bolt hole in spacer plate 34 is attached to motorcycle front structure 14 using the same hardware as was used before to attach rack 12 to structure 14.

Typically, the concluding step is fastening pack 10 to rack 12. It will be noted that the elongate support 26 has bolt holes at a second fastening location 31 and third fastening location 33. Locations 31 and 33 are spaced to align with the pre-existing bolt holes 12D in section 12A of the longitudinal arms of rack 12. Accordingly, bolts 40 are placed through bolt holes 31 and 33 of support 26 and through the bolt holes 12D of rack 12 and threaded into the underside of pack 10, as shown in FIG. 5.

It will be noted that bolt hole 32 is not centered between bolt holes 31 and 33 of support 26. In fact, dimension "a" and is greater than dimension "b" (FIG. 4). This allows the option of orienting support 26 so bolt hole 31 is located either toward the front or the back. Consequently, when bolt hole 31 is oriented toward the back, pack 10 will be shifted back further than if bolt hole 31 were oriented toward the front. In any event, the placement of bolt holes and the use of spacers 34 allows one to shift pack 10 back about two inches (5.1 cm). It will be appreciated that in other embodiments the kit will be designed to shift pack 10 a greater or lesser amount. A shift of only two inches (5.1 cm) was found to increase the riding comfort of a passenger a surprising amount.

It is appreciated that various modifications may be implemented with respect to the above described, preferred embodiment. While support 26 is preferably made of extruded aluminum, in other embodiments the support can be made of plastic, wood, steel, or other appropriately rigid materials. Also, in some embodiments support 26 can be composed of separate components that are fastened together in any appropriate way. Instead of a rectangular bar with a cylindrical groove, the support may have other cross-sections and may be made larger or smaller depending upon the desired reinforcing strength. The illustrated spacer plate can have various outlines, including rounded corners, and may be made of steel or other appropriate materials. Also while bolt fasteners are illustrated, in other embodiments fastening can be performed in other ways Obviously, many modifications and variations of the present invention are possible in light of the above teachings. It is therefore to be understood that within the scope of the appended claims, the invention may be practiced otherwise than as specifically described.

What is claimed is:

1. A pack extension kit for rearwardly shifting a pack-supporting rack having a pair of longitudinal arms normally supported in the rear by a rear structure on a motorcycle and in the front by a pair of front structures on said motorcycle, said kit comprising:

a pair of elongate supports sized to separately cradle said longitudinal arms of said rack, each of said elongate supports having (a) a first fastening location adapted to be attached to said rear support structure, and (b) a second fastening location adapted to be attached to said pack through one of said longitudinal arms, and a pair of spacers each adapted to be separately attached between one of said front structures and a corresponding one of said longitudinal arms.

2. A pack extension kit according to claim 1 wherein said elongate supports each have a pair of opposing walls sized to embrace one of said longitudinal arms.

3. A pack extension kit according to claim 1 wherein said elongate supports each have a longitudinally aligned cylindrical groove.

4. A pack extension kit according to claim 1 wherein said first and said second fastening locations each comprise a bolt hole.

5. A pack extension kit according to claim 4 wherein each of said elongate supports comprise a third fastening location adapted to be attached to said pack through one of said longitudinal arms.

6. A pack extension kit according to claim 5 wherein said first fastening location is between and spaced from said second and said third fastening locations.

7. A pack extension kit according to claim 6 wherein said first fastening location is off centered between said second and said third fastening locations.

8. A pack extension kit according to claim 1 wherein each of said pair of spacers comprises:

a plate with a spaced pair of bolt holes.

9. A pack extension kit according to claim 1 wherein said pair of spacers are sized to shift said pack back 2 inches or more.

10. A method for rearwardly shifting a pack-supporting rack having a pair of longitudinal arms normally supported in the rear by a rear structure on a motorcycle and in the front by a pair of front structures on said motorcycle, said method comprising the steps of:

detaching said pack and said rack from said motorcycle;

contemporaneously mounting (a) a pair of elongate supports between said rear structure and said pair of longitudinal arms, and (b) a pair of spacers between said front structures and said longitudinal arms; and fastening said pack in place on said rack by fastening from said elongate supports through said rack to said pack.

11. A method according to claim 10 wherein the step of fastening said pack in place is performed by inserting bolts through holes existing in said longitudinal arms before detachment of said pack without making new holes in said rack.

12. A method according to claim 10 wherein the step of mounting said elongate supports is performed by bolting to said rear structure.

13. A method according to claim 12 wherein the step of fastening said pack is performed by bolting through said longitudinal arms in front of and behind said rear structure.

14. An assembly for mounting a pack on a pack-supporting rack having a pair of longitudinal arms normally supported in the rear by a rear structure on a motorcycle and in the front by a pair of front structures on said motorcycle, said assembly comprising:

a pair of elongate supports sized to separately cradle said longitudinal arms of said rack, each of said elongate supports having (a) a first fastening location attached to said rear support structure, and (b) a second fastening location attached to said pack through one of said longitudinal arms, and a pair of spacers each separately attached between one of said front structures and a corresponding one of said longitudinal arms.

* * * * *